United States Patent [19]
Kiser

[11] 3,895,464
[45] July 22, 1975

[54] LUMBER DRESSING AND DIMENSIONING MACHINE

[75] Inventor: Fred W. Kiser, Hopkins, Minn.

[73] Assignee: Timesavers, Inc., Minneapolis, Minn.

[22] Filed: Apr. 22, 1974

[21] Appl. No.: 463,115

[52] U.S. Cl. ............... 51/137; 51/80 A; 51/140; 144/116
[51] Int. Cl. ............... B24b 21/04; B24b 9/18
[58] Field of Search ............ 51/135 R, 135 BT, 140, 51/142, 139, 147, 137, 138, 80 R, 80 A, 81 R, 82 R, 87 R; 74/241; 242/57.1; 198/202; 144/39, 116, 117

[56] References Cited
UNITED STATES PATENTS

| | | | |
|---|---|---|---|
| 1,303,344 | 5/1919 | McCune | 51/80 A |
| 2,220,268 | 11/1940 | Olsen | 51/135 BT |
| 2,274,268 | 2/1942 | Hercik | 51/135 BT |
| 2,637,951 | 5/1953 | White | 51/140 |
| 2,680,938 | 6/1954 | Peterson | 51/87 R X |
| 3,118,314 | 1/1964 | Schuster | 198/202 X |
| 3,178,860 | 4/1965 | Clyne | 51/140 X |
| 3,269,065 | 8/1966 | Nylund | 51/139 |
| 3,541,735 | 11/1970 | Schaller | 51/140 X |
| 3,624,965 | 12/1971 | Gepfert | 51/138 X |

*Primary Examiner*—Al Lawrence Smith
*Assistant Examiner*—Nicholas P. Godici

[57] ABSTRACT

A lumber dressing and dimensioning machine having coacting feed rolls which grip and feed lumber lengthwise and in succession to and between a pair of medially pivoted abrasive belt type abrading heads oriented to simultaneously act on the opposite side edge surfaces of the lumber, to thereby dimension the width of the lumber, and then to and between a second pair of medially pivoted abrasive belt type abrading heads oriented to simultaneously act upon the top and bottom faces of the lumber to give the lumber its prescribed thickness. In both sets of abrading heads, one of them is adjustable towards and from the other to enable the machine to handle different sized lumber. The abrading heads which act upon the side edge surfaces of the lumber are freely transversely shiftable in unison, to accommodate edgewise bowed or warped lumber. Abrasive flap brushes are arranged to finish the surfaces of the lumber and, at the same time, round off its longitudinally extending corners.

8 Claims, 9 Drawing Figures

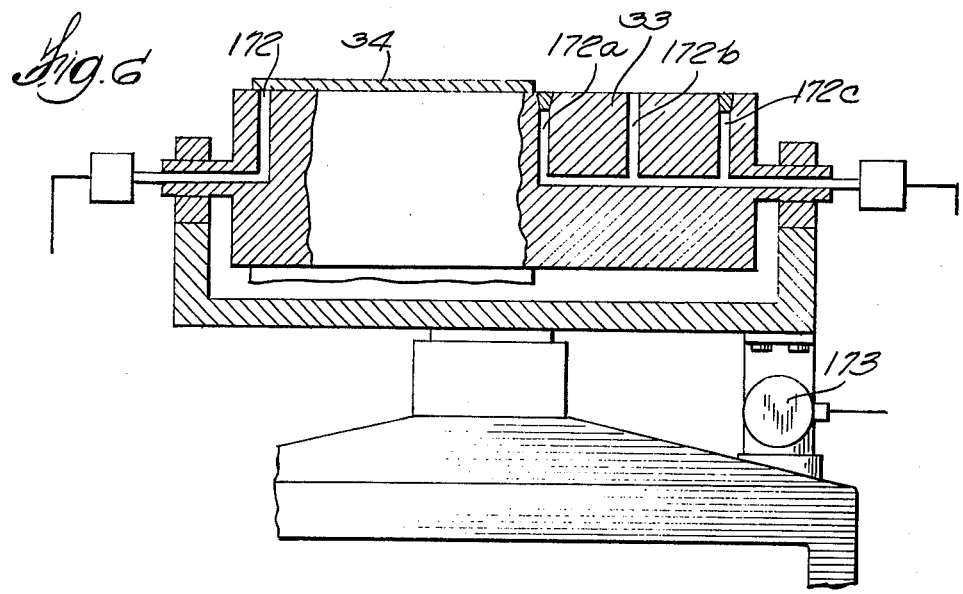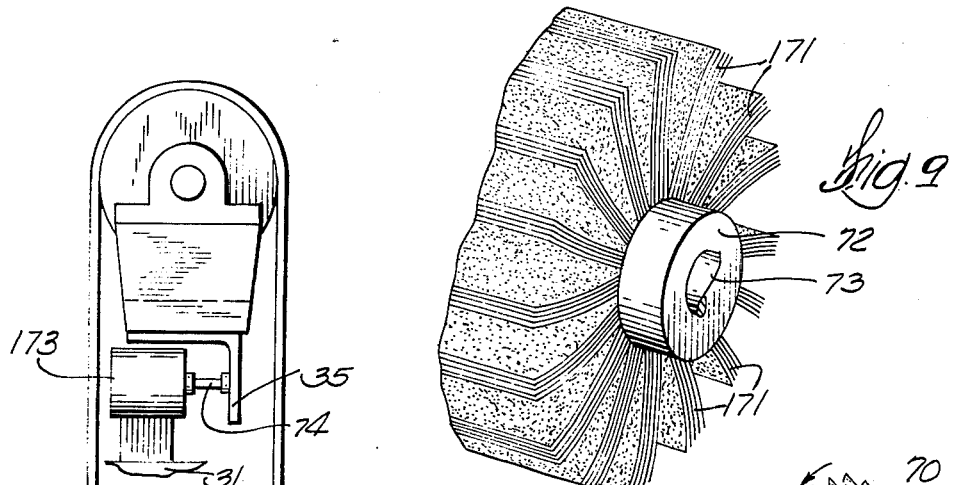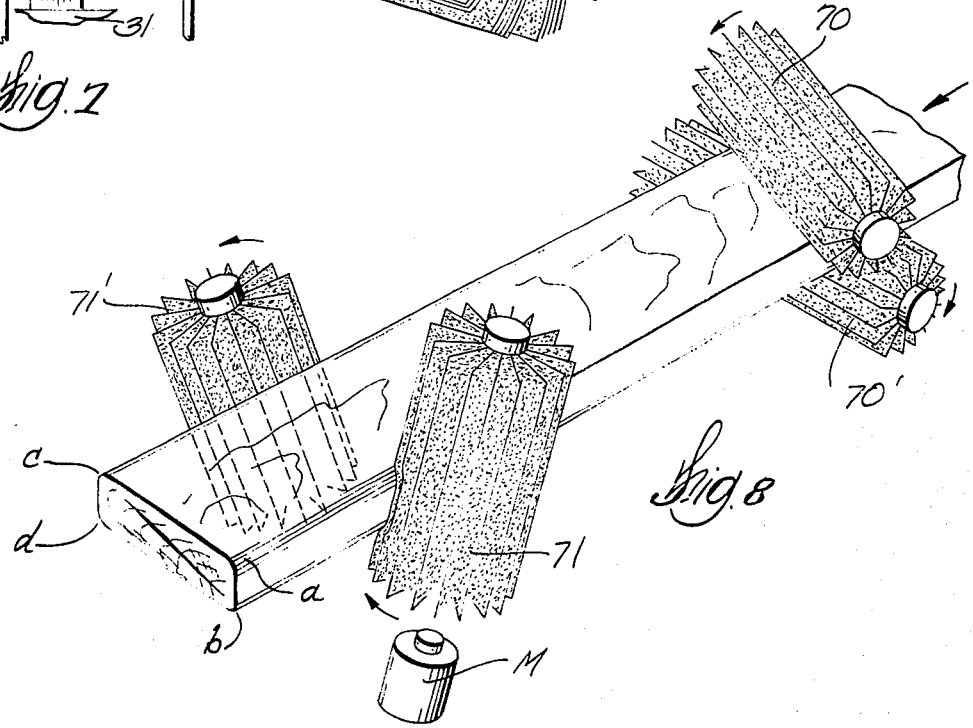

LUMBER DRESSING AND DIMENSIONING MACHINE

This invention relates to the dressing and dimensioning of lumber.

As it comes from the saw mill, the cross sectional dimensions of lumber intended for the building trade are intentionally larger than the prescribed standard to allow for dimensioning the lumber by removal of stock from its surfaces. Heretofore this was done on conventional planing machines which ordinarily plane one surface at a time.

While the product of the conventional planing procedure was quite satisfactory, both from the standpoint of cross sectional dimensions and surface finish, the cost involved in doing the job that way was relatively high.

Another disadvantage of using conventional planing machines for dimensioning lumber was the inability of such machines to cope with lumber that is edgewise bowed or warped, a condition that is not uncommon, especially in long lengths such as two-by-fours.

The present invention overcomes both of these disadvantages.

Toward that major objective, the machine of this invention utilizes the abrading technique of abrasive belt type sanding and grinding machines of which the Pendergast U.S. Pat. No. 2,876,600; the Schuster U.S. Pat. No. 3,118,314; the Rutt U.S. Pat. No. 3,504,458; the Owrey et al. U.S. Pat. No. 3,520,089, and the Bernu U.S. Pat. No. 3,777,442 are examples.

An especially significant feature of the machine of this invention resides in the manner it abrades the side edge surfaces of the lumber. This is done by opposed abrading devices that act simultaneously upon both side edge surfaces and are free to shift or move laterally in unison in directions normal to the side edge surfaces. By virtue of that free lateral shiftability of the abrading devices, they accommodate themselves to edgewise bowed or warped lumber while removing from both side edge surfaces the amount of stock needed to give the lumber the prescribed width dimension.

Another feature and object of the invention is to provide in a single machine, abrasive type stock removing devices that collectively act upon all four surfaces of lumber fed lengthwise through the machine, so that in one pass, the lumber is correctly dimensioned and is given a smooth finish on all of its four surfaces.

To accomplish stock removal from all four surfaces of the lumber in one pass through the machine, the machine of this invention has two pairs of opposed abrading heads, one pair acting upon the top and bottom surfaces and the other acting upon the side edge surfaces of the lumber. All of these abrading heads are of the conventional abrasive belt type wherein an endless abrasive belt is trained over a power driven contact drum and a belt tensioning idler roll, and is held in work performing engagement with the stock by pressure exerted on the belt through the contact drum. Obviously, the abrasive belt must be as wide as the greatest width of the work surface to be abraded thereby. When that condition exists, the wear on the abrasive belt is uniform across its entire width, but if the work surface is substantially narrower than the belt, the belt would not be worn uniformly across its width since only a portion of its width would have abrading engagement with the work.

With a veiw toward assuring that wear on the belts will be as uniform as possible across the full width thereof, despite the fact that the machine must be capable of handling lumber of widely differing cross sectional dimensions, the abrading heads that act upon the side edge surfaces of the lumber have abrasive belts that are significantly wider than the widest side edge surface for which the machine is designed, and are continuously and alternately shifted edgewise so that the belts are not only worn uniformly across their width but also require less frequent replacement.

Towards the same objective, in the abrading heads that act upon the top and bottom surfaces of the lumber as it passes through the machine, uneven wear of the abrasive belts is eliminated by having the belts slightly wider than the maximum width of lumber the machine is designed to handle, and by shifting the belts edgewise different distances depending upon the width of the lumber being acted upon — the distance being greatest for the narrowest lumber and decreasing as the width dimension of the lumber increases.

Dimensioned lumber for the building trade has the longitudinally extending corners that are formed by the junctions of its side edge surfaces with its wider face surfaces, rounded off to make handling more comfortable. When conventional planing machines were used for dimensioning lumber, the rounded corners were obtained by having the rotary knives of the machine shaped and ground to have concavely curved cutting edges at the ends of the knives.

The present invention achieves the same result in a far more flexible and less costly way through a novel manner of using abrading devices that are commonly referred to as abrasive flap brushes.

In summation, therefore, everything achieved with the prior way of dimensioning and dressing lumber is accomplished by this invention but at considerably less cost and at higher production rates.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 6 is a view of the belt tensioning roll of one of the abrading heads that act upon the wider top and bottom surfaces of the lumber, and its mounting structure and illustrating how change in direction of the edgewise shifting of the abrasive belt is initiated and the distance the belt shifts edgewise is controlled;

FIG. 7 is an end view of the structure shown in FIG. 6;

FIG. 8 is a diagrammatic perspective view illustrating the manner in which rotary abrasive flap brushes are employed to round off the longitudinally extending corners of the lumber; and FIG. 9 is a perspective view of a portion of a typical abrasive flap brush.

Figure 1:
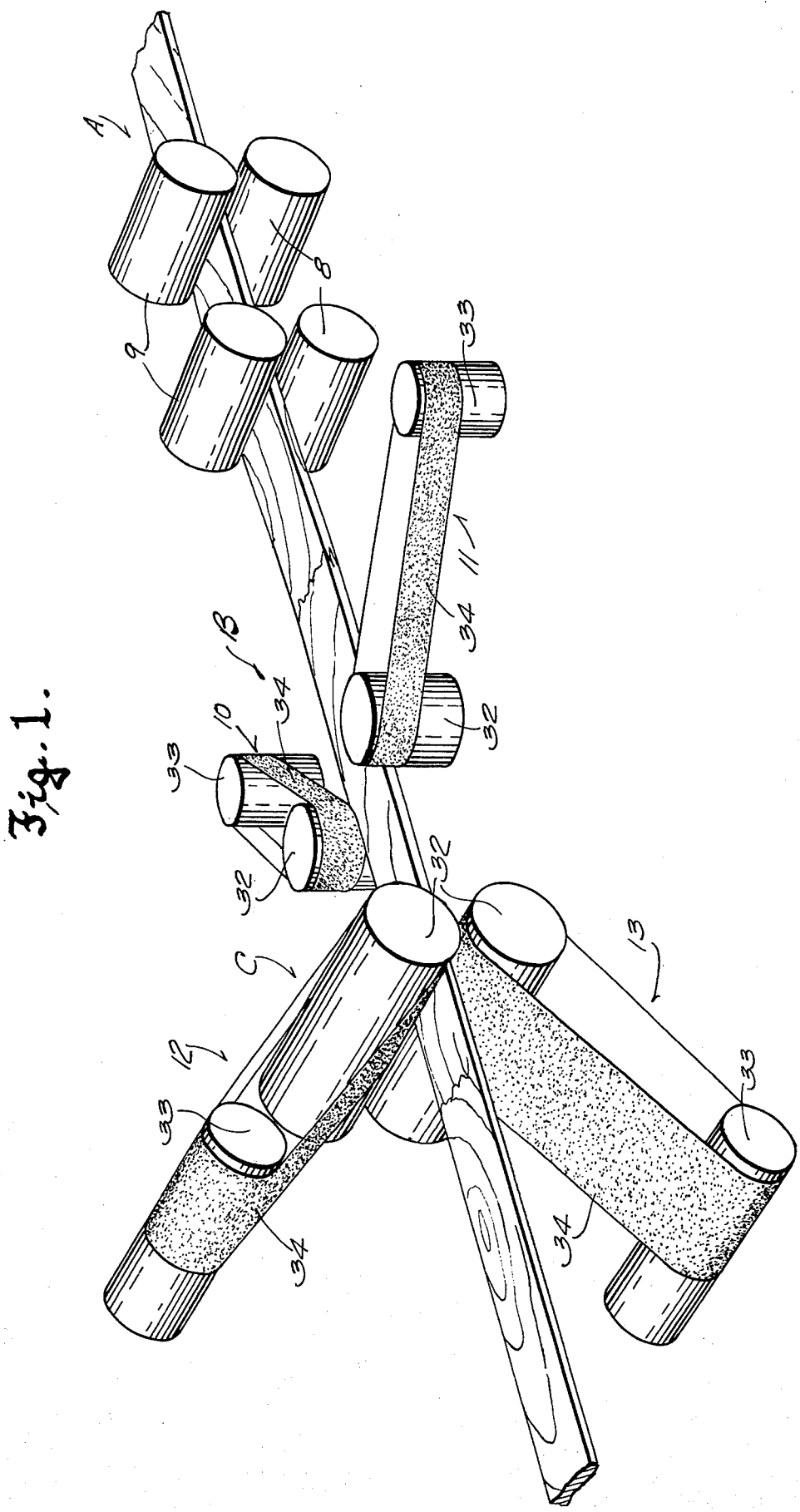
FIG. 1 is a diagrammatic perspective view illustrating the manner in which the machine of this invention dresses the four surfaces of a piece of lumber in one pass through the machine.
Figure 2:
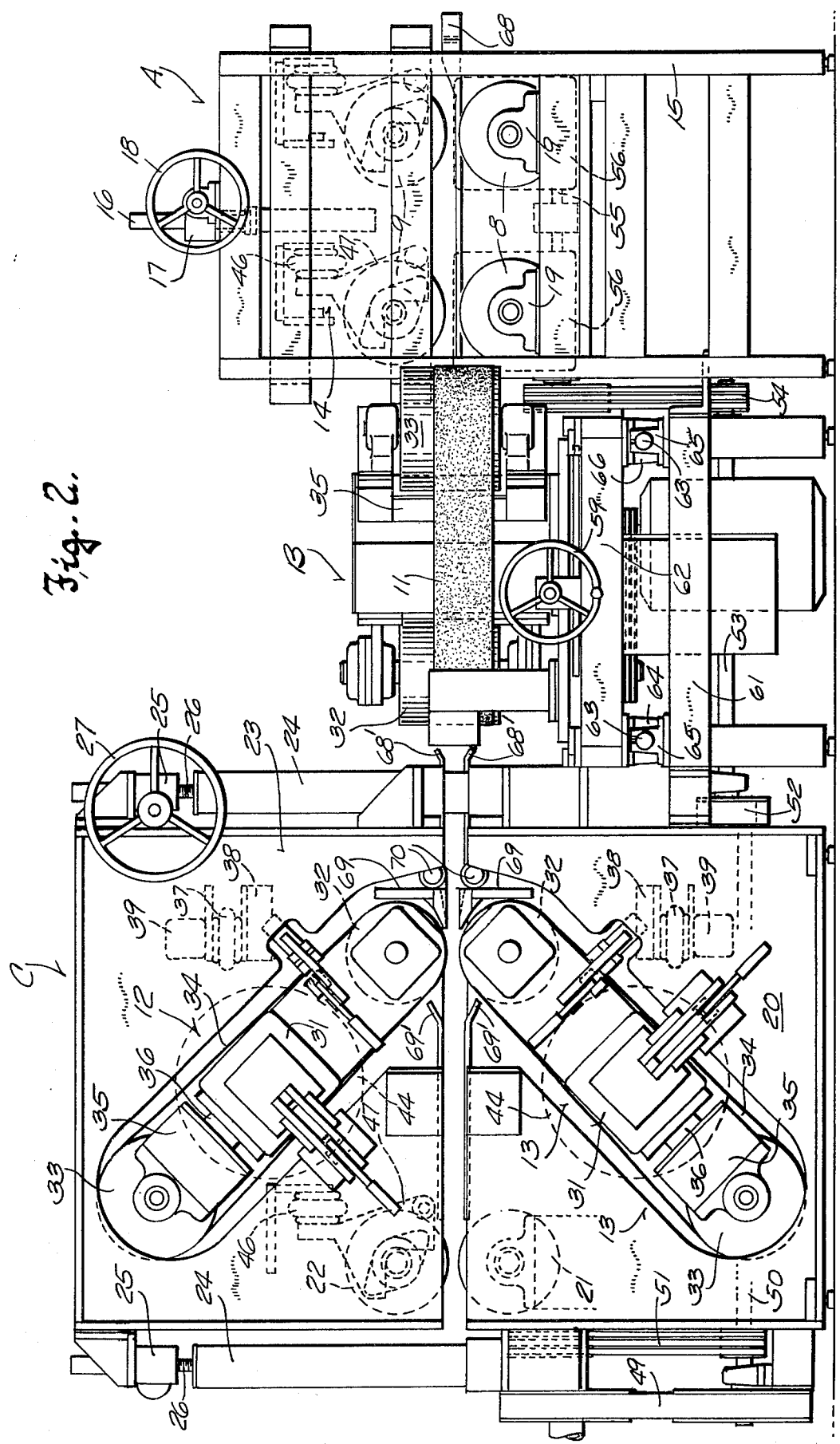
FIG. 2 is a side view of the machine.
Figure 3:
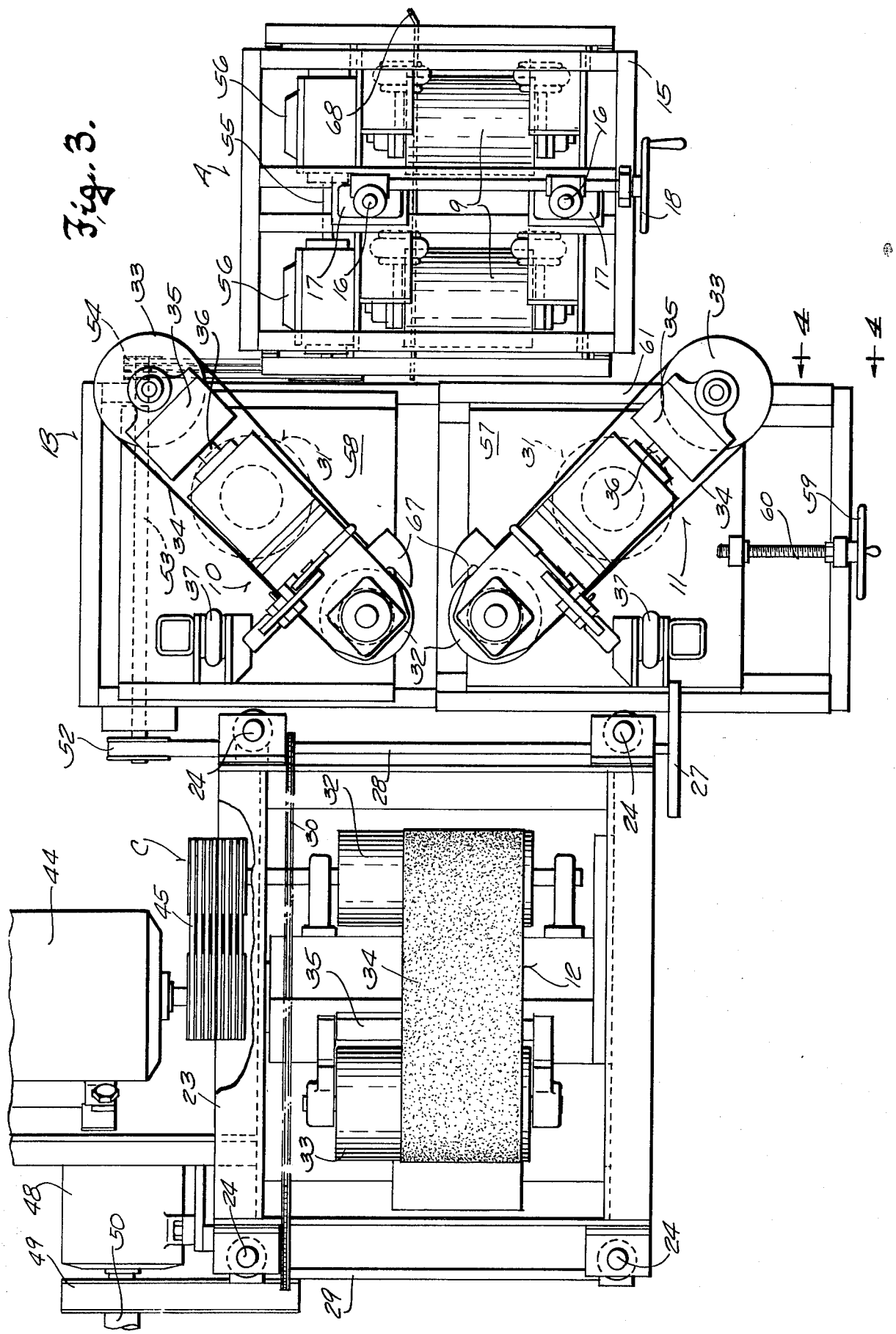
FIG. 3 is a top view of the machine.

Referring to the drawings the lumber to be dressed and dimensioned is presented in any suitable manner to an infeed or receiving section of the machine, designated A, where it is gripped by coacting conveyor and pinch rolls 8 and 9, to be fed thereby along a straight linear path successively through a width dimensioning section B and a thickness dimensioning section C. Although each of these three sections of the machine has its own frame or base, they are rigidly tied together in proper alignment.

In section B the machine dimensions the width of the lumber by removing a predetermined amount of stock from each side edge. This is done by a pair of opposed abrading heads 10 and 11, the latter being adjustable to accommodate lumber of different widths.

Section C of the machine also has a pair of opposed upper and lower abrading heads, designated generally by the numerals 12 and 13. These abrading heads act upon the top and bottom faces of the lumber and thereby dimension its thickness. Again, to enable the machine to handle lumber of different sizes, the upper abrading head 12 is vertically adjustable.

The feed rolls 8 and 9, of course, must be long enough to handle the widest lumber for which the machine is designed, and to accommodate lumber of different thickness, the pinch rolls 9 are carried by a frame structure 14 that is vertically adjustable in the stationary main frame 15 of section A. Two vertically oriented lead screws 16 that are fixed to the frame structure 14 have nuts thereon that are caged in housings 17 fixed to the top of the main frame 15, to hold the frame structure 14 at its selected elevation. That elevation is obtained by rotation of a handwheel 18 connected through conventional motion transmitting means with the nuts on the lead screws. Hence, by turning the handwheel, the frame structure 14 with the freely rotatable pinch rolls 9 thereon, can be raised and lowered.

The conveyor rolls 8 which are power driven in a manner to be described, are journalled in bearings 19 that are fixed on the main frame 15. The top of these rolls thus establishes the elevation of the path of the lumber passing through the machine.

With the elevation of the path of the lumber thus established, it is of course necessary that the lower abrading head 13 in section C — which is not adjustable — be positioned to act upon the underside of the lumber as it passes through the machine. This is assured by mounting the abrading head 13 at the proper elevation in the stationary main frame 20 of section C.

The main frame 20 also mounts a power driven conveyor roll 21 which is similar to the conveyor rolls 9 in the infeed section A, and coacts with an adjustable pinch roll 22 to grip the lumber downstream of the coacting top and bottom abrading heads 12 and 13. The coacting rolls 21 and 22 thus cooperate with the infeed rolls in Section A in advancing the lumber through the machine. It should be noted that the coacting conveyor and pinch rolls grip the lumber so securely that it does not deviate from a straight linear path as it is fed through the machine. Obviously, all of the conveyor rolls must be driven at the same speed; the manner in which this is done will be described later.

The pinch roll 22, and also the upper abrading head 12 are mounted in a frame structure 23 that is connected with the base frame 20 for up and down translation. Four jack posts 24, one at each corner of the base frame, guide the up and down translation of the frame 23, and to effect such translation, rotation is imparted to nuts that are caged in housings 25 fixed to the frame structure 23 and threaded on lead screws 26 that are mounted in the posts 24. The nuts 25 are simultaneously rotatable by means of a hand wheel 27 drivingly connected therewith through conventional transmission means which includes cross shafts 28 and 29 and a sprocket chain 30.

Up and down adjustment of the frame 23 adapts the top and bottom surface abrading station C to different thickness of lumber, since by such adjustment the distance between abrading heads 12 and 13 is increased or decreased.

The abrading heads in both the width defining section B and the thickness defining section C in many respects are like that of the aforesaid Pendergast U.S. Pat. No. 2,876,600. As such, they are of the medially pivoted type with their frame structures 31 pivotally and supportingly connected with the structure upon which they are mounted.

Each abrading head has a contact drum 32 journaled in one end of its frame structure and an idler belt tensioning roll 33 at its other end. The endless abrasive belt 34 is of course trained about the contact drum 32 and the belt tensioning roll 33. The roll 33 is journaled in bearings mounted in the arms of a U-shaped yoke 35 which, in turn, is connected with the frame structure of the abrading head by being fixed to the plunger 36 of an air cylinder secured to the frame structure 31 of the abrading head. Hence, by controlling the entry of air under pressure into this cylinder, its plunger 36 will be projected to tension the abrasive belt or retracted to enable removal and replacement of the belt.

Having the belt tensioning rolls 33 of the abrading heads carried by the plungers 36 enables them to be rocked about the axis of the plungers, a characteristic which — as will be later described — makes it possible to shift the abrasive belts edgewise to bring about more uniform wear of the belts.

All of the abrading heads are biased to rock about the axes of their pivotal connections with the structures on which they are mounted, by so-called "air springs" 37 which, as is well known, are simply rubber walled circular chambers. The Firestone Rubber Company sells such air springs under its trademark "Firestone Airmount." The air springs are interposed between pressure bars 38 that are rigid with the frame structures 31 of the abrading heads and supports 39 that are rigidly fixed to the structures to which the abrading heads are pivotally connected. So located, the air springs urge the contact drums of the opposed abrading heads towards one another.

Figure 5:
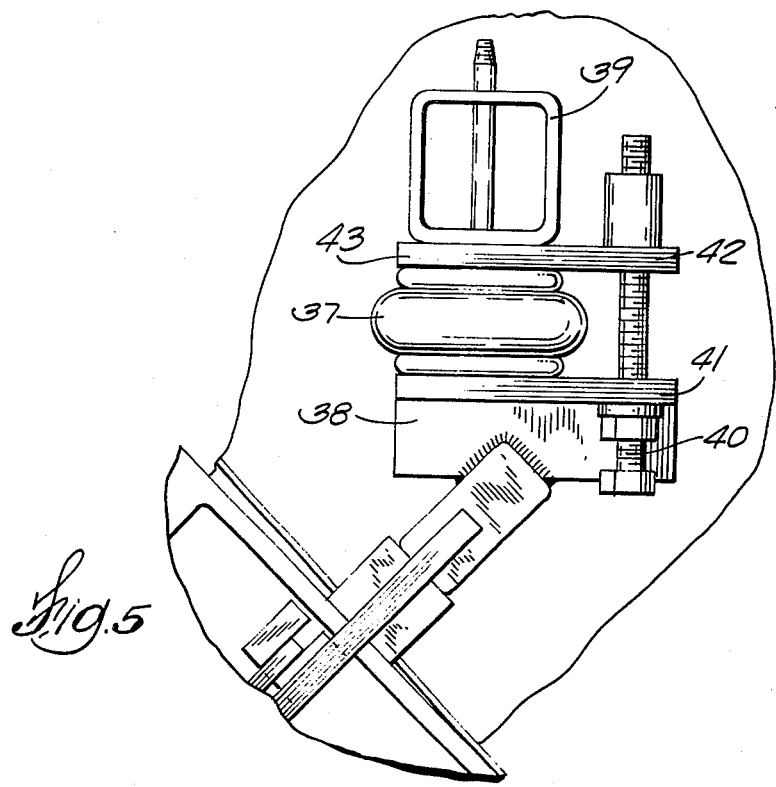
FIG. 5 is a fragmentary view illustrating a detail of the machine.

As illustrated in FIG. 5, the extent of the motion produced by expansion of the air springs 37 — and hence the distance they can move their respective abrading heads in the directions to reduce the distance between the contact drums — is adjustably limited. For this purpose, each air spring assembly has an adjusting bolt 40 passing slidably through a hole in an arm 41 that is fixed to the pressure bar 38 of the abrading head against which the thrust of that air spring is applied, and threaded in a boss 42 on an arm 43 that is rigid with the adjacent support 39. When there is no lumber between the abrading head, the head of the adjusting bolt bears against the arm 41 to limit expansion of the air spring.

The endless abrasive belts of the abrading heads 12 and 13 or the thickness dimensioning section C are driven by motors 44 that are mounted coaxially with the pivot axes of the heads, and are drivingly connected with the contact drums of the abrading heads by V-belt drives 45. This manner of driving the abrasive belts is conventional, being shown, for instance, in the aforesaid Pendergast patent.

The pinch rolls 9 and 22 are biased downwardly towards their companion conveyor rolls by air springs 46 similar to the air springs 37, reacting between pivotally mounted carriers 47 in which the pinch rolls are journalled and structure that is rigid with the adjustable frames 14 and 23, and in each case conventional adjustable motion limiting means like that already described is provided to define the distance the pinch rolls approach their companion conveyor rolls when nothing is between them.

All of the conveyor rolls are driven at the same speed by a motor 48 that is drivingly connected with the conveyor rolls by suitable transmission means including a drive belt 49, a shaft 50 extending longitudinally along the bottom of the section C, a belt drive 51 connecting the shaft 50 with the conveyor roll 21 at the discharge end of the machine through a speed reducer (not shown), another belt 52 that carries the drive from the shaft 50 to another shaft 53 that extends longitudinally along the bottom of section B and is drivingly connected by belts 54 with a shaft 55. This shaft 55 drives a pair of speed reducers 56 which are like the one that drives the conveyor roll 22. The outputs of these speed reducers 56 are directly connected to the conveyor rolls 8.

As already noted, all of the abrading heads are, for all intents and purposes, substantially identical, except that, in section B, the abrasive belts are narrower than in section C.

To enable the machine to handle lumber of different widths, the abrading head 11 in section B is mounted on a frame 57 that is adjustable towards and from the frame 58 on which the companion abrading head 10 is pivoted. A handwheel 59 which turns a lead screw 60 provides the means for effecting this adjustment.

There is, however, a very significant difference between sections B and C in the manner in which their respective abrading heads are connected with the stationary main frames of the two sections. This difference lies in the fact that both the adjustable frame 57 and the non-adjustable frame 58 in section B are not directly mounted on its main frame 61, but on a carriage 62 that rides on tracks 63 that extend transversely of the machine and are fixed to the stationary main frame or base 61. Since the tracks 63 are transverse to the machine, the movement of the carriage therealong is perpendicular to the edge surfaces of lumber passing through the machine.

Figure 4:
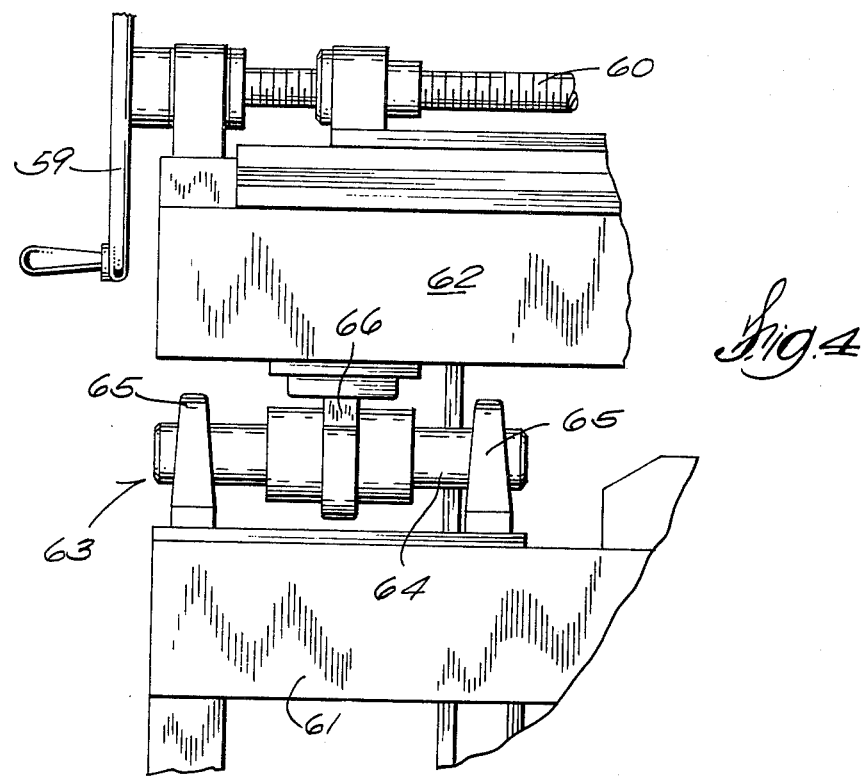
FIG. 4 is an enlarged detail view taken on the plane of the line 4—4 in FIG. 2.

Although the tracks 63 may take any suitable form, the design illustrated in FIG. 4 has been found to be exceptionally practical. With this design the tracks are in four sections, one at each of the corners of the stationary main frame or base 61. Each track section consists of a shaft 64 long enough to accommodate the maximum motion required of the carriage 62, solidly mounted on the main frame base 61 by shaft supports 65. Between these supports, the shaft has a pillow block 66 mounted thereon. This pillow block is equipped with a self-aligning ball bearing type bushing and is fixed to the underside of the carriage 62. Pillow blocks of this type are sold by Thomson Industries, Inc.

With the carriage mounted in the manner described, the entire edge abrading structure is free to accommodate itself not only to the lateral location of an entering piece of lumber, but also to any edgewise bowed or warped condition of the lumber. Thus, no matter how lacking in straightness a piece of lumber might be, its width downstream of the abrading heads 10 and 11 will be uniform along its entire length. The machine makes no attempt to correct an edgewise bowed or warped condition of the lumber, but accepts it as it is and simply gives it uniform width from end to end.

Conventional feed shoes, diagrammatically indicated at 67, are mounted directly upstream of the abrading heads 10 and 11 of section B to engage the side edge surfaces of approaching lumber and, in so doing, adjust the abrading heads to the lateral position of that piece of lumber — even though it may not have been carefully fed into the machine. Hence, no particular guidance is needed in positioning the lumber fed into the machine. However, for convenience, a fence 68 may be provided at the feed station of the machine to locate the edge of the lumber which will be acted upon by the abrading head 10 on a line that forms a shallow chord with the periphery of the contact drum of the head 10. This will also locate the opposite side edge of the lumber in the same relation to the contact drum of the companion abrading head 11 — provided that the frame 57 has been properly adjusted.

In section C, the frames 20 and 23 on which the companion abrading heads 13 and 12 are mounted, have pressure loaded infeed shoes 69 positioned thereon directly upstream of the contact drums of the heads 12 and 13. These shoes and the structure by which they are mounted and biased is very much like that of the Olin U.S. Pat. No. 3,782,044, and hence are pivotally mounted, as at 70, and biased by air springs (not shown) into engagement with the lumber just before and also after it comes in contact with the abrading heads 12 and 13. The infeed shoes 69 thus serve to guide the lumber into proper position to be acted upon by the abrading heads 12 and 13, and farther upstream from the infeed shoes such guidance is afforded by opposed infeed slides 68' that are also mounted on the frame structures 20 and 23.

After leaving the abrading heads 12 and 13, the lumber is guided by outfeed slides 69' which terminate just upstream from the outfeed rolls 21 and 22.

Although not shown, all of the abrading heads are equipped with dust hoods, the mouths of which are located close to the zones of action to draw the dust and products of abrasion out of the machine.

If the lumber to be dressed leaves the saw mill with its thickness sufficiently near the prescribed dimension, the abrading heads 12 and 13 in section C can be replaced with two pairs of opposed abrasive flap brushes 70–70' and 71–71', as more or less diagrammatically illustrated in FIG. 8. Abrasive flap brushes are well known devices that are often used to polish metal surfaces. They consist of a multitude of abrasive surfaced fabric strips 171 projecting radially from a hub 72 on a shaft 73 (FIG. 9).

With the abrasive flap brushes mounted as shown in FIG. 8 and driven in any suitable manner as by the diagrammatically illustrated motors M, all four surfaces of the lumber are dressed therby, but more important, at the same time that the finish of these surfaces is improved by the rotary brushes, the four longitudinally extending corners — designated $a$, $b$, $c$ and $d$ in FIG. 8 — are rounded. This desirable improvement in the product of the machine results from having the axes about which the brushes rotate disposed at oblique angles to one another; but, of course, lying in planes parallel to the surfaces of the lumber they act upon. Thus, the axes of the brushes 70–70' lie in horizontal planes so spaced from one another that their flaps strike the top and bottom surfaces of the lumber passing therebetween. This correct spacing is, of course, obtained by adjustment of the frame, not shown in FIG. 8, on which the upper brush 70 is mounted, but which would be similar — at least functionally — to the adjustable frame 23 in section C.

Understandably, the axes of the other pair of brushes 71–71' lie in vertical planes so spaced from one another that these brushes effectively stroke the side edge surfaces of the lumber, and again to accommodate lumber of different widths, the frame or mounting structure that carries one of these brushes, would be adjustable, as is the frame 57 in section B.

Bodily shiftability in unison, of the edge dressing brushes 71–71' could be incorporated, but if the brush flaps are sufficiently flexible, that is not necessary.

The most significant thing about the manner in which the flap brushes are mounted is the oblique angular disposition of their axes with respect to the straight linear path of the lumber through the machine.

As shown in FIG. 8, the axes of each pair of coacting brushes define an acute angle to one another, and that angle is bisected by a plane that is perpendicular to and square with the straight linear path of the lumber. As a result of that angular disposition of the brushes and rotation of the brushes in the directions indicated in FIG. 8, not only will the finish on all surfaces of the lumber be improved but, in addition, its longitudinally extending corners will be rounded off. This desirable rounding off results from the fact that as the brushes ride onto the surface they act upon, the flaps of the brush 70' will wrap around the corner $b$, the flaps of the brush 70 will wrap around the corner $c$, the brush 71' will attack the corner $d$ and the brush 71 will take care of the remaining corner $a$.

As noted hereinbefore, the belt tensioning rolls 33 of all of the abrading heads have freedom to rock about axes that perpendicularly intersect their axes of rotation. By positively imparting such rocking or oscillation to the belt tensioning rolls alternately in opposite directions, their respective abrasive belts will shift edgewise back and forth to thereby distribute the wear on the belt uniformly across its entire width. The aforesaid Schuster U.S. Pat. No. 3,118,314 fully and completely describes the manner in which the belt tensioning rolls are rocked, though in that patent the objective was to restrain the belt from shifting too far from a centered location.

As shown in FIG. 6 the belt tensioning rolls have air discharge ports or orifices 172 opening to their cylindrical surface at axially spaced locations. These ports are connected with pneumatic control systems such as those of the Schuster patent. Hence, closure of a port or orifice at one end of the roll as the belt nears that end, causes its associated control system to activate an air cylinder 173 to rock the roll in the direction to effect edgewise shifting of the belt towards the other end of the roll. When the belt reaches the limit of its edgewise displacement towards that opposite end of the roll, another port 172 is covered by the advancing belt and as a result the system is actuated to again cause edgewise movement of the belt in the opposite direction.

As shown in FIG. 7 the cylinder 173 is secured to the frame 31 of the abrading head and its plunger 74 is connected with the yoke 35 in which the tensioning roll is journalled.

Because the range of thickness of lumber which the machine is capable of handling is not too great, the abrasive belts of the abrading heads 10 and 11 in section B need not be as wide as they are in the abrading heads 12 and 13 in section C. Accordingly, for the heads 10 and 11, the distance the belts shift need not be adjustable. There are therefore only two ports 172 in the belt tensioning rolls of these heads, one near each end thereof.

However, for the wider range of lumber widths, the belts are slightly wider than the widest lumber for which the machine is designed, and the belt tensioning rolls and contact drums are considerably longer than the width of the belts. Obviously for the widest lumber the full width of the belts is needed. Hence, when maximum width lumber is being handled, the belts should not be intentionally shifted but merely kept from wandering too far in either direction, as in the Schuster patent; but for narrower lumber, best belt use is obtained by shifting the belts through as wide a range as possible.

To meet these different requirements, the belt tensioning roll of each of the abrading heads 12 and 13 has one port 172 near that end of the roll that is adjacent to the edge of the lumber acted upon by the stationary abrading head in section B, and — near its other end — the roll has a plurality of spaced apart ports, as for instance, three identified in FIG. 6 as 172$a$, 172$b$ and 172$c$. By selectively closing all but one of the ports 172$a$, 172$b$ and 172$c$ in any desired fashion, as for example by the plugs shown, the distance the belt shifts can be chosen to be most favorable for the particular width of the lumber being handled. In FIG. 6, the ports 172$a$ and 172$c$ are plugged.

Those skilled in the art will appreciate that the invention can be embodied in forms other than as herein disclosed for purposes of illustration.

The invention is defined by the following claims:

I claim:

1. A machine for dressing lumber having length, width and thickness and for sizing the same to predetermined uniform width along the entire length thereof, said machine being characterized by:

A. power driven feed means to grip pieces of lumber presented to the machine and feed the same lengthwise through the machine along a straight linear path;

B. a pair of opposed power driven abrading devices to act simultaneously upon the opposite side edge surface of lumber fed lengthwise through the machine;

C. transversely extending horizontal track means fixed in the machine;

D. carriage means riding on and unrestrictedly free for back and forth translation along said track means; and E. means mounting both of said pair of abrading devices on said carriage means for movement therewith, with the abrading devices spaced apart a distance to simultaneously abrade said opposite side edge surfaces to a predetermined depth, whereby by virtue of said abrading devices being both mounted on the carriage means and the latter being free for back and forth translation along said track means, the width of the lumber after being thus abraded is uniform along its entire length regardless of any possible edgewise bowed or warped condition thereof.

2. The machine of claim 1, wherein said opposed abrading devices are a pair of abrading heads having power driven endless abrasive belts held in work performing engagement with the surfaces being abraded, by backup means engaging the back side of the belts and maintained under tension by being trained over belt tensioning rolls.

3. The machine of claim 2, wherein said opposed abrading heads have elongated frame structures with a contact drum at one end and a belt tensioning roll at the other end, the contact drums forming the backup means, and wherein said elongated frame structure of each of said abrading heads is pivotally connected medially of its ends with the carriage means.

4. The machine of claim 3, further characterized by pressure means acting on the pivoted frame structures to yieldingly urge the same in the direction to force their contact drums towards one another.

5. The machine of claim 4, wherein said pressure means are pressurized elastic-walled chambers, expansion of which moves the pivoted frame structures in said direction, and further characterized by means for adjustably limiting expansion of said chambers.

6. The machine of claim 1, further characterized by:

A. a pair of rotary abrasive flap brushes positioned to abrade and dress the opposite side edge surfaces of the lumber after they have been acted upon by said abrading devices, said brushes being mounted with their axes lying in vertical planes and hence parallel to the side edge surfaces of pieces of lumber fed through the machine and at divergent angles to one another, so that the zones of contact between the brushes and the lumber extend obliquely across its side edge surfaces at opposite angles; and B. power means for rotating said brushes in such directions that they round off two of the longitudinally extending corners of the lumber in addition to dressing said side edge surfaces;

and further characterized by

C. a second pair of similarly obliquely disposed rotary power driven abrasive flap brushes positioned to simultaneously dress the top and bottom surfaces of the lumber and round off its other two longitudinally extending corners.

7. The machine of claim 2, wherein the mounting of one of said pair of abrading heads on said carriage means is fixed and the mounting of the other abrading head on said carriage means provides for adjustment of its location on the carriage means in directions parallel to said tranversely extending track means to enable the machine to handle lumber of different widths, and further characterized by:

a second pair of opposed abrading heads positioned to act upon the top and bottom surfaces of pieces of lumber fed through the machine, the abrasive belts of which are wide enough to span the width of the widest and hence considerably wider than the narrowest lumber the machine is designed to handle, and the belt tensioning rolls of which are considerably longer than the width of the abrasive belts, wherein the belt tensioning rolls of said second pair of abrading heads are fixed against axial displacement from positions in which one end thereof is adjacent to the abrading head of said first pair thereof that has its mounting fixed on said carriage means, and further characterized by means for causing the abrasive belt of each of said second pair of abrading heads to shift edgewise back and forth along the length of its belt tensioning roll through a distance proportional to the width of the lumber being fed through the machine, said means including 1. belt sensing means near said identified end of the associated belt tensioning roll, 2. a plurality of belt sensing means spaced axially different distances from the other end of said belt tensioning roll, and 3. means for rendering all but a selected one of said plurality of belt sensing means inactive.

8. A machine for simultaneously dressing the four flat surfaces of lengths of lumber fed endwise through the machine along a straight linear path, comprising:

A. a pair of rotary abrasive flap brushes positioned to act upon and dress the opposite side edge surfaces of the lumber;

B. a second pair of rotary abrasive flap brushes positioned to act upon and dress the top and bottom surfaces of the lumber, each of said brushes being mounted with its axis lying in a plane parallel to the flat surface of the lumber it acts upon, and disposed obliquely to said linear path, the angle of obliqueness of the axes of the two brushes of each pair of said flap brushes being in opposite directions, and collectively the angles of said obliqueness of the axes of the two pairs of flap brushes being such that upon rotation of the flap brushes in the direction to cause the flaps of each of the brushes to strike a different one of the four corners formed at the junctions of the four surfaces of the lumber before they strike the surface acted upon by that flap brush, all of said four corners will be rounded off; and C. power means for rotating the flap brushes in said directions.

* * * * *